US010104438B1

(12) United States Patent
Thompson et al.

(10) Patent No.: US 10,104,438 B1
(45) Date of Patent: Oct. 16, 2018

(54) AUTOMATIC POPULATION OF A PROGRAMMING GUIDE MOSAIC SCREEN

(71) Applicant: Cox Communications, Inc., Atlanta, GA (US)

(72) Inventors: Catherine Elizabeth Thompson, Roswell, GA (US); John Kelly King, Atlanta, GA (US); Katy Kozee, Atlanta, GA (US); Anant Patil, Marietta, GA (US)

(73) Assignee: COX COMMUNICATIONS, INC, Atlanta, GA (US)

( * ) Notice: Subject to any disclaimer, the term of this patent is extended or adjusted under 35 U.S.C. 154(b) by 0 days.

(21) Appl. No.: 14/214,192

(22) Filed: Mar. 14, 2014

Related U.S. Application Data (60) Provisional application No. 61/794,434, filed on Mar. 15, 2013, provisional application No. 61/801,555, filed on Mar. 15, 2013, provisional application No. 61/800,968, filed on Mar. 15, 2013.

(51) Int. Cl.
*H04N 21/482* (2011.01)
*H04N 21/462* (2011.01)
*H04N 21/472* (2011.01)

(52) U.S. Cl.
CPC .............. *H04N 21/4826* (2013.01)

(58) Field of Classification Search
USPC .............. 725/46, 40, 38; 348/564, 388, 598
See application file for complete search history.

(56) References Cited

U.S. PATENT DOCUMENTS

| | | | |
|---|---|---|---|
| 7,117,440 B2* | 10/2006 | Gordon et al. | 715/721 |
| 7,174,512 B2 | 2/2007 | Martin et al. | |
| 7,185,355 B1 | 2/2007 | Ellis et al. | |
| 7,231,607 B2* | 6/2007 | Neely | G06F 17/30849 |
| | | | 348/E5.105 |
| 7,757,252 B1 | 7/2010 | Agasse | |
| 7,900,228 B2* | 3/2011 | Stark et al. | 725/45 |
| 8,132,208 B2* | 3/2012 | Gonzalez | 725/46 |

(Continued)

OTHER PUBLICATIONS

U.S. Appl. No. 14/216,469, filed Mar. 17, 2014 entitled "Generating Andy Dynamically Updating a Personalized Programming Guide".

(Continued)

*Primary Examiner* — Nathan Flynn
*Assistant Examiner* — Caroline Somera
(74) *Attorney, Agent, or Firm* — Merchant & Gould (57) ABSTRACT

Automatic population of a programming guide mosaic screen is provided. Attributes relating to a user or group of users may be collected and utilized to identify one or more recommended content items relevant to the user. A visual display of the recommended content may comprise a combination of content currently airing on a channel selected by the user as a favorite channel, content rated highly by the user and/or by other users, content matching a commonly watched genre by the user, content associated with keyword searches, etc. Factors utilized to determine the type of content to automatically include in the programming guide mosaic screen may be dynamically updated according to changes in video viewing activity, received feedback, content purchases, or changes made to the user's preference data.

20 Claims, 4 Drawing Sheets

(56) References Cited

U.S. PATENT DOCUMENTS

| | | | |
|---|---|---|---|
| 8,789,126 B1* | 7/2014 | Nijim et al. | 725/133 |
| 8,856,847 B2 | 10/2014 | Soroushian | |
| 8,930,999 B1* | 1/2015 | Maeng | 725/41 |
| 8,997,151 B2 | 3/2015 | Chai et al. | |
| 2002/0075408 A1 | 6/2002 | Curreri | |
| 2003/0093782 A1 | 5/2003 | Labeeb et al. | |
| 2003/0115589 A1 | 6/2003 | D'Souza et al. | |
| 2004/0268403 A1 | 12/2004 | Krieger | |
| 2006/0107302 A1* | 5/2006 | Zdepski | 725/135 |
| 2006/0174269 A1 | 8/2006 | Hansen-Turton | |
| 2007/0011702 A1* | 1/2007 | Vaysman | 725/45 |
| 2007/0204302 A1* | 8/2007 | Calzone | 725/46 |
| 2007/0234388 A1* | 10/2007 | King | 725/39 |
| 2007/0250865 A1* | 10/2007 | Krakirian | H04N 5/44543 725/58 |
| 2007/0266403 A1* | 11/2007 | Ou et al. | 725/46 |
| 2007/0283276 A1* | 12/2007 | Neely | G06F 17/30849 715/747 |
| 2008/0060006 A1* | 3/2008 | Shanks et al. | 725/38 |
| 2008/0066103 A1* | 3/2008 | Ellis et al. | 725/38 |
| 2008/0155600 A1 | 6/2008 | Klappert et al. | |
| 2008/0235730 A1 | 9/2008 | Guillorit | |
| 2009/0070809 A1 | 3/2009 | Kendall et al. | |
| 2009/0070812 A1 | 3/2009 | Sasaki | |
| 2009/0228943 A1 | 9/2009 | Ramaswamy et al. | |
| 2010/0131983 A1* | 5/2010 | Shannon et al. | 725/46 |
| 2010/0262995 A1 | 10/2010 | Woods et al. | |
| 2011/0072463 A1* | 3/2011 | Zaslavsky | H04N 21/4316 725/41 |
| 2011/0173664 A1 | 7/2011 | Knudson | |
| 2011/0283325 A1 | 11/2011 | Tomita | |
| 2011/0307925 A1* | 12/2011 | Vaysman et al. | 725/48 |
| 2012/0011544 A1* | 1/2012 | Vaysman et al. | 725/38 |
| 2012/0054803 A1 | 3/2012 | Lee | |
| 2012/0131603 A1 | 5/2012 | Williamson et al. | |
| 2012/0192218 A1 | 7/2012 | Schwesinger | |
| 2013/0067519 A1 | 3/2013 | Yates | |
| 2013/0347038 A1* | 12/2013 | Lee | H04N 21/4312 725/40 |
| 2014/0047467 A1 | 2/2014 | Arling et al. | |
| 2014/0089980 A1 | 3/2014 | Alexander et al. | |
| 2014/0282734 A1 | 9/2014 | Stern | |
| 2015/0095927 A1* | 4/2015 | NaikRaikar | H04N 21/44222 725/14 |
| 2015/0237390 A1 | 8/2015 | Watters | |

OTHER PUBLICATIONS

U.S. Official Action dated Dec. 29, 2014 in U.S. Appl. No. 14/213,998, 42 pgs.

U.S. Official Action dated Jan. 5, 2015 in U.S. Appl. No. 14/214,090, 31 pgs.

U.S. Official Action dated Jan. 21, 2015 in U.S. Appl. No. 14/216,469, 32 pgs.

U.S. Official Action dated May 28, 2015 in U.S. Appl. No. 14/214,090, 23 pgs.

U.S. Official Action dated Jun. 17, 2015 in U.S. Appl. No. 14/213,998, 30 pgs.

U.S. Official Action dated Jul. 30, 2015 in U.S. Appl. No. 14/216,469, 37 pgs.

U.S. Appl. No. 14/213,998, Notice of Allowance dated Mar. 1, 2016, 18 pgs.

U.S. Appl. No. 14/216,469, Office Action dated Mar. 17, 2016, 22 pgs.

Notice of Allowance dated Dec. 15, 2015 in U.S. Appl. No. 14/214,090, 22 pgs.

U.S. Appl. No. 14/213,998, filed Mar. 14, 2014 entitled "Customized Mosaic Screen".

U.S. Appl. No. 14/214,090, filed Mar. 14, 2014 entitled "Personalized Mosaic Integrated With the Guide".

U.S. Final Official Action dated Jul. 12, 2017, in U.S. Appl. No. 14/216,469, 20 pgs.

U.S. Final Official Action dated Sep. 30, 2016 in U.S. Appl. No. 14/216,469, 34 pgs.

Notice of Allowance dated Jan. 25, 2018, in U.S. Appl. No. 14/216,469, 18 pgs.

\* cited by examiner

AUTOMATIC POPULATION OF A PROGRAMMING GUIDE MOSAIC SCREEN

CROSS-REFERENCE TO RELATED APPLICATIONS

The application claims priority to U.S. Provisional Patent Application No. 61/794,434 titled "Auto-Population of a Mosaic Screen" filed Mar. 15, 2013, U.S. Provisional Patent Application No. 61/801,555 titled "Personalized Mosaics Integrated with the Guide" filed Mar. 15, 2013, and U.S. Provisional Patent Application No. 61/800,968 titled "Customized Mosaic Screen" filed Mar. 15, 2013, the disclosures of which are hereby incorporated by reference in their entireties.

BACKGROUND

Most television services provide programming guides displaying scheduling information for current and upcoming programming. Modern programming guides are oftentimes interactive, allowing users to navigate scheduling information menus, and to select and discover programs by time, title, channel or genre using an input device such as a keypad, computer keyboard or television remote control. Many service providers offer a multi-screen display, herein referred to as a mosaic, comprising a collection of elements or channels displayed on a single screen is provided. Most often, each channel may be represented as a thumbnail image or video feed of the channel which a user may be enabled to navigate to listen to audio related to the content playing on the channel or to select for viewing.

Currently, most mosaics provide a display of channels that are genre based, static, defined with preset channels, or that are manually selected by a user. That is, most mosaics are not automatically tailored to a particular user. Additionally, a mosaic is oftentimes hard to locate within a menu system and is generally not appealing to a user because it is static and may be limited to preset channels. Accordingly, subscribers have limited usage of mosaics.

It is with respect to these and other considerations that the present invention has been made.

SUMMARY

Embodiments provide for automatic population of a programming guide mosaic screen. Attributes relating to a user or group of users may be collected and utilized to identify one or more recommended content items that may be relevant to the user. A visual display of the one or more recommended content items may be provided in a mosaic screen. The visual display of the recommended content displayed within the programming guide mosaic screen may comprise a combination of content currently airing on a channel selected by the user as a favorite channel, content rated highly by the user and/or by other users, content matching a commonly watched genre by the user, content associated with keyword searches, etc.

Factors utilized to determine the type of content to automatically include in the programming guide mosaic screen may be dynamically updated according to changes in the user's viewing activity, changes in other users' viewing activity, content purchases, received feedback, changes to the user's preference data, searches for content performed by the user, etc. Additionally, the user may be enabled to selectively replace content displayed in a video pane with a next recommended content item.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Referring now to the drawings in which like reference numbers represent corresponding parts throughout the several figures.

DETAILED DESCRIPTION

As briefly described above, embodiments of the present invention provide for automatic population of a programming guide mosaic screen. Generally, embodiments may be utilized to automatically populate a programming guide mosaic screen with one or more content items recommended to the user based on collected data. The one or more content items may comprise a combination of content currently airing on a channel selected by the user as a favorite channel, content rated highly by the user and/or by other users, content matching a commonly watched genre by the user, content associated with searches made by the user, etc. Video panes displayed within the mosaic screen may be automatically populated with recommended content without direct input from a user.

Factors utilized to determine the type of content to automatically include in the programming guide mosaic screen may be dynamically updated according to changes in the user's viewing activity, changes in other users' viewing activity, content purchases, received feedback, changes to the user's preference data, searches for content performed by the user, etc. Additionally, the user may be enabled to selectively replace content displayed in a video pane with a next recommended content item.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Figure 1:
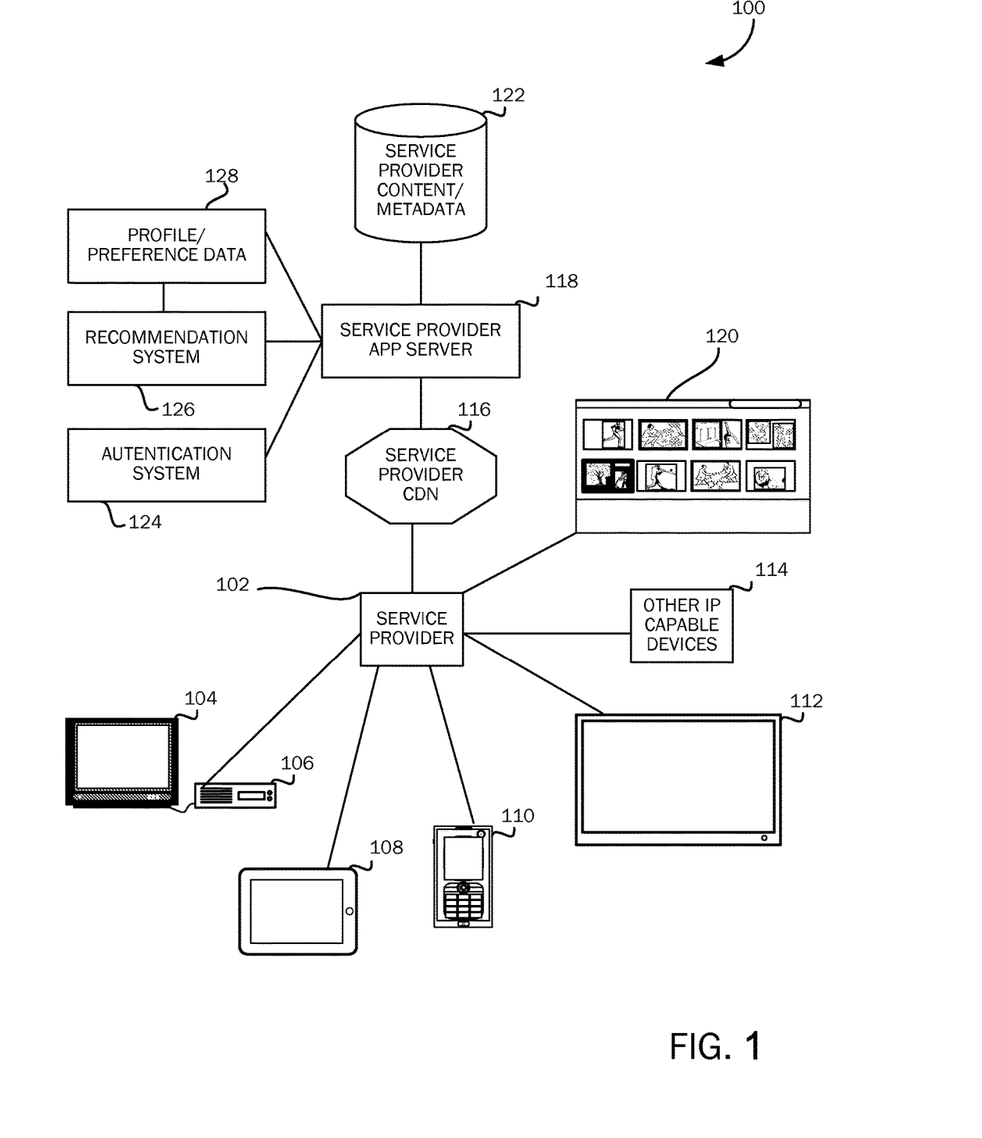
FIG. 1 is a simplified block diagram of an exemplary system for automatic population of a programming guide mosaic screen.

FIG. 1 is a simplified block diagram of an exemplary system 100 for providing integration of a personalized mosaic screen within a programming guide. Referring to the lower portion of FIG. 1, a service provider 102 is illustrated for providing a variety of video content items to users/subscribers via one or more receiver devices. The service provider 102 is illustrative of any service provider, for example, a cable television service provider, a satellite-based television service provider, an Internet protocol-based service provider, or any other service provider that is operable to provide audio, video, or a combination of audio and video content for consumption via a variety of receiving devices. A detailed illustration and description of an example cable television services provider system is provided below with reference to FIG. 4.

Receiving devices include any device capable of receiving audio and video content and for allowing consumption of the content. For example, a receiving device may include such devices as a television 104 and associated set-top box 106, a tablet computing device 108, a mobile telephone 110, a smart television 112, or other (IP) capable device 114. As will be described below, each of these types of devices may be used for accessing and consuming content via a primary service provider.

A service provider content delivery network (CDN) 116 is illustrated in association with the service provider 102, and a service provider back end and application server 118 are illustrated in association with the service provider CDN 116. As should be appreciated, the layout of the functionalities of the service provider including the service provider CDN and the service provider back end and application server system are for purposes of illustration only and are not restrictive of the various layouts and combinations of systems that may be utilized by a given service provider for providing content to users/subscribers.

According to embodiments, a service provider back end/application server 118 may provide functionality for maintaining profile information on users/subscribers including permissions for users/subscribers to utilize service provider functionality including consumption of service provider content and including such functionalities as content preferences, parental control systems, billing systems, and the like. The back end and application server for the service provider may provide operating functionality, for example, one or more software applications and associated databases for directing content distribution provided by the service provider 102 to users/subscribers at the receiving devices 104, 108, 110, 112, 114.

The service provider content delivery network (CDN) 116 is illustrative of a delivery or distribution network which may include a distributed system of servers, databases, and other content repositories for distributing audio and video content, text, graphics, media files, software applications and associated documents, on-demand content, social media content, live streaming media content, and the like from the service provider 102 to the users/subscribers. CDNs typically function by receiving requests from clients, checking a local cache for a copy of the requested resource, or querying some source if a requested resource is not in the cache or has expired for example. CDN servers can be strategically located at the edges of various networks to limit loads on network interconnects and backbones. CDN servers can be redundantly deployed and interact with other CDN servers to respond to content requests from clients in attempts to optimize content delivery. For example, network edge servers can enable ease of browsing, navigating and streaming of content, including streaming live video. For example, if a given user/subscriber operating the tablet computing device 108 selects a news story for live streaming to the tablet computing device 108 as offered by the service provider 102, the application server at the back end application server may cause a media player to activate for streaming the desired content from the service provider CDN 116 to the user's tablet computing device 108 via IP-based transmission to the tablet computing device 108.

A programming guide mosaic screen 120 is illustrated with which the service provider 102 may provide information about and access to one or more features or attributes of available programming. The programming guide mosaic screen 120 may be displayed on any of the content receiving devices 104, 108, 110, 112, 114 for allowing users/subscribers to review information about and gain access to available programming provided by the service provider 102. As will be described herein, in addition to programming provided by the service provider 102, the programming guide mosaic screen 120 may be populated with information identifying and describing third party content, and the user/subscriber may utilize the programming guide mosaic screen 120 for navigating to and consuming the third party content.

The service provider content/metadata 122 is illustrative of content and associated descriptive metadata that may be maintained and provided by the primary service provider 102, or may be obtained from third party sources. The content/metadata may also comprise information associated with the content including descriptive metadata for use in distributing the content and associated metadata through the back end application server of the service provider 102 via the service provider CDN 116, as described above. As should be appreciated, metadata associated with content may include information such as content titles, content authors, content creation date, content ratings, information describing content plots, summaries, mood, or any other information that may be provided in association with a given content item. In addition to metadata associated with a given content item, for example, a movie, television show, news event, sports event, and the like, additional metadata for the content item may be produced and provided by the service provider, for example, information relating to viewing times, viewing channels, and the like designated by the service provider 102.

The authentication system 124 is illustrative of one or more software applications and databases operative to determine whether a requesting user/subscriber may access requested primary service provider content according to embodiments. That is, if a user/subscriber attempts to access one or more primary service provider content items, the authentication system 124 may be queried by the service provider back end application server 118 for determining whether the requesting user/subscriber is authorized to access the requested information including a determination of whether parental controls or other mechanisms are in place for blocking access to a requesting user/subscriber.

The recommendation system 126 is illustrative of one or more software applications operative to query profile/preference data 128 maintained by the primary service provider via the back end application server for users/subscribers for recommending both primary service provider content and third party content. For example, if profile/preference data maintained for a given user/subscriber in the profile/preference data 128 shows that a given user is fond of a particular genre of content, for example, action movies, the recommendation system 126 may utilize such profile/preference data for recommending both primary service provider content and third party content to the user/subscriber via the programming guide mosaic screen 120. Further, it should also be noted that a request for recommendation data may be sent to the service provider application server 118. The retrieved data may then be received by the recommendations system 126 of the service provider 116, and the appropriate set of data may be retrieved and sent to a requesting set top box 106.

Further, it should be noted that the system may also manage access to various receiving devices (e.g., tablet devices). For example, a channel may have rights associated with it to allow for streaming inside and outside the home. In some embodiments, a head of household having a parent account can identify users, such that when somebody logs in with his/her credentials, he/she would be able to access his/her favorite channels. Further, parental controls may also be tied to the devices.

According to embodiments, various pieces of data associated with preferences, viewing activity, purchased content, and feedback may be collected and saved as profile/preference data 128 maintained by the primary service provider. For example, collected data may include a specific user's viewing activity, other users' viewing activity, content purchases, keyword search data, preferences set by the user (e.g., favorite channels, preferred genres, restrictions, etc.), feedback provided by the user, feedback provided by other users, etc. Attributes associated with the specific user's viewing activity may also be collected and saved, such as viewing days and times of specific types of content. A user may watch certain types of content during the week, and different types of content on the weekends. Additionally, the user may typically watch a certain genre of content in the mornings versus a different type of genre of content in the afternoons and in the evenings. Data may be collected and saved continually.

According to embodiments, a programming guide mosaic screen 120 may be automatically populated with available video content for a specific user according to the collected data. Accordingly, the user may be presented with a programming guide comprising content relevant to him/her without having to set up the programming guide. Content displayed within the programming guide mosaic screen 120 may be dynamically updated based on such information as content frequently watched by the user, content recently frequently watched by other users, rating information, preference data, content searched for by the user, the day of the week, and the time of the day.

Figure 2:
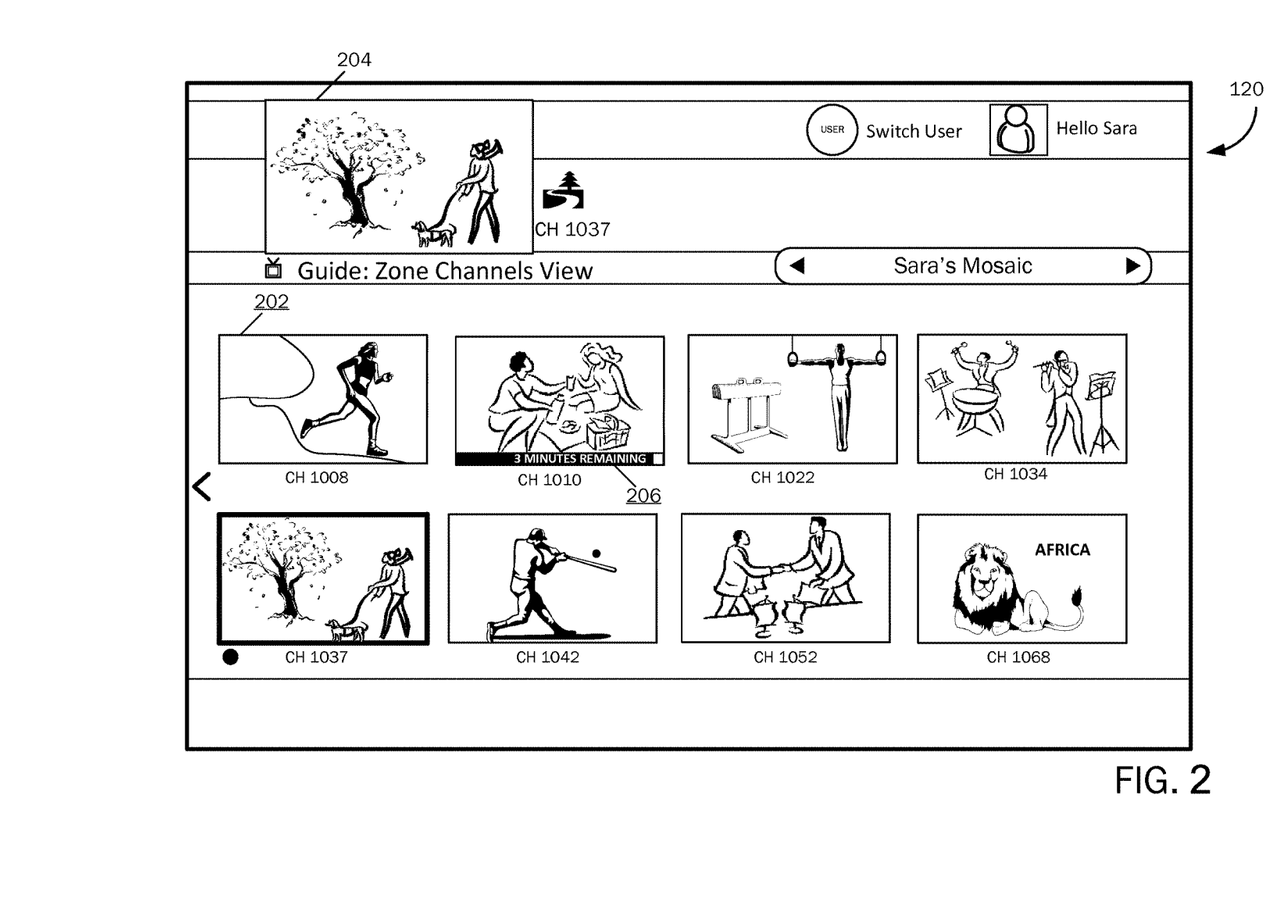
FIG. 2 is an illustration of an example programming guide mosaic screen comprising automatically populated content.

Programming guides are useful tools for displaying scheduling information for current and upcoming programming, and mosaic screens are useful for providing a visual representation of available video content. With reference now to FIG. 2, an example programming guide mosaic screen 120 is shown. As illustrated, a programming guide mosaic screen 120 may comprise a plurality of individual video tiles/panes 202 having currently airing content displayed on each of the video panes on a single mosaic screen. The programming guide mosaic screen 120 may also comprise a scaled window 204, which may display content the user is currently watching (i.e., content playing on a channel currently connected to). For example, if a user is watching CNN and selects to view the programming guide to see what else is on, the content playing on CNN may continue to be displayed in the scaled window 204. A user may select a video pane 202 displayed in the programming guide mosaic screen 120, and the content playing in the selected video pane 202 may be displayed in the scaled window 204.

According to embodiments, the programming guide mosaic screen 120 may be automatically populated with content based on a determination of what content the specific user may want to watch. The determination may be made by the recommendation system 126. When a user selects to view the programming guide mosaic screen 120, content that is currently available to select for viewing and that is recommended for the user may be displayed in the plurality of video panes 202. The video panes 202 may be populated with a combination of content that is airing on channels the user may have selected as his/her favorite channels, as well as content that the user has rated highly, content that has been highly rated by other users, content that fits a genre determined to be a genre liked by the user, and content that the user has searched for previously. Additionally, the type of content selected for population of the mosaic screen may be dependent on the day of the week and the time of the day. Further, content may be filtered according to restrictions set by the user or by the head of the household. For example, a user or parent may select to filter out content that is rated R.

Referring still to FIG. 2, an indicator 206 showing how much time is left in a program may be displayed in or near a video pane 202. When the program is nearing the end or when the program has ended, the video pane 202 may be automatically repopulated with a next content item determined to be relevant to the user.

Figure 3:
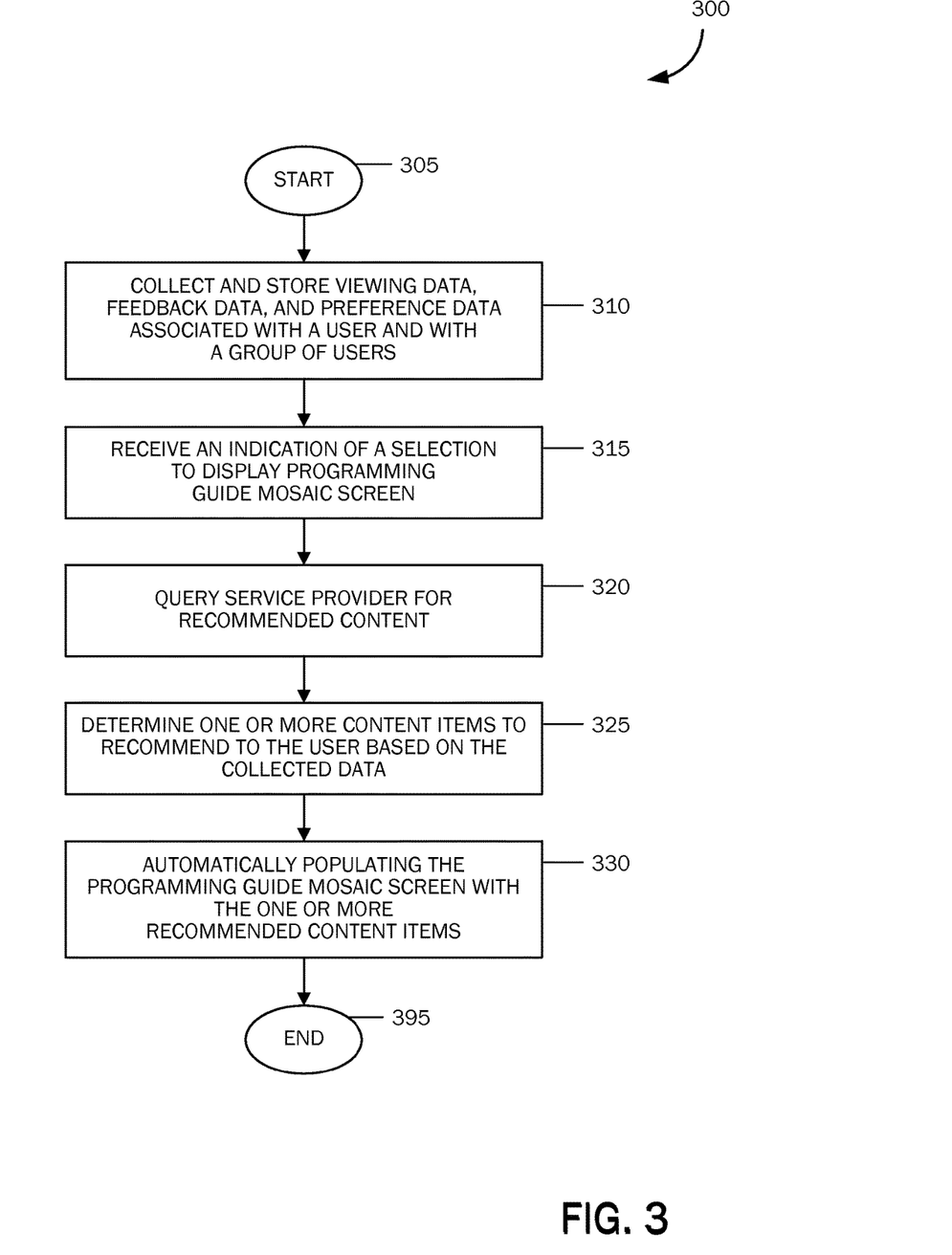
FIG. 3 is a flowchart illustrating a method for providing automatic population of a mosaic screen.

FIG. 3 is a flowchart of a method for automatically populating a mosaic screen with relevant content for a specific user. The method 300 starts at OPERATION 305, and proceeds to OPERATION 310, where viewing data, feedback data, search data, and preference data associated with a specific user and with a group of users may be collected and stored. Viewing data may include specific attributes, such as a day of the week or a time of the day that certain types of content is consumed by the user or by other users. Feedback data may include rating data provided by the user and by other users. Preference data may include data associated with types of restricted content, selections by the user of one or more favorite channels and/or preferred genres, etc. Data associated with the specific user may be stored as profile/preference data 128 maintained by the primary service provider.

At OPERATION 315, an indication of a selection to display the programming guide may be received. For example, the user may select a button on a remote control device, or may select an option displayed on a screen of the user's viewing device to display the guide. The selection may comprise a selection to view the programming guide in a mosaic format.

At OPERATION 320, the service provider may be queried for recommended content items for display in the programming guide. At OPERATION 325, a determination may be made as to which content items to recommend to the specific user. The determination may be made according to what content is currently airing that may be relevant to the user based on the collected data.

The method 300 may proceed to OPERATION 330, where one or more recommended content items are sent to a requesting device, and may be automatically populated into a generated mosaic display of the programming guide. The one or more recommended content items may be displayed in the video panes 202. As described above, the user may select to remove a recommended content item from the mosaic, wherein a next recommended content item may replace the removed item. The user may select a recommended content item for viewing. The method 300 may end at OPERATION 395.

Figure 4:
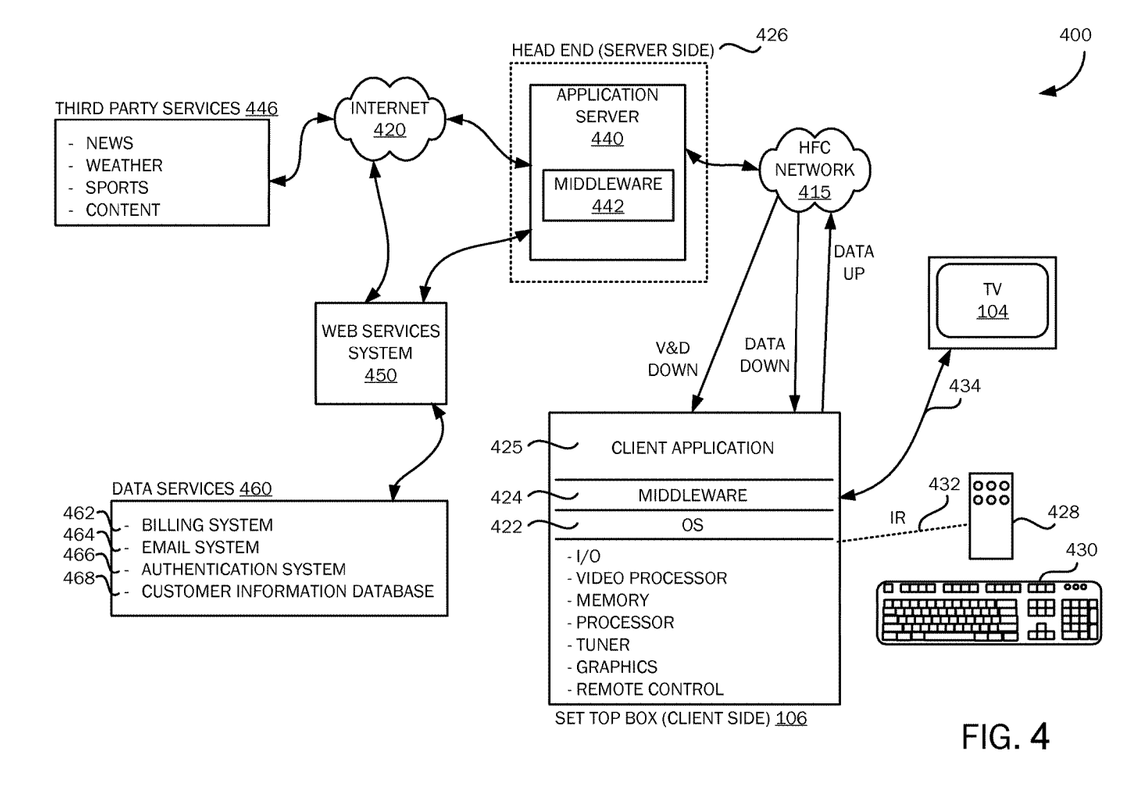
FIG. 4 is a simplified block diagram illustrating a cable television services system architecture providing an operating environment according to an embodiment.

FIG. 4 is a simplified block diagram illustrating a cable television services system 400 (hereafter referred to as "CATV") architecture providing an operating environment according to an embodiment. As can be appreciated, a CATV architecture is but one of various types of systems that may be utilized to provide recording of network-related content. For example, other systems such as satellite-based television services systems may be utilized for providing interaction between a customer/subscriber and third party content as set out above. Referring now to FIG. 4, digital and analog video programming, information content and interactive television services are provided via a hybrid fiber coax (HFC) network 415 to a television set 104 for consumption by a cable television/services system customer. As is known to those skilled in the art, HFC networks 415 combine both optical fiber and coaxial cable lines. Typically, optical fiber runs from the cable head end 426 to neighborhoods of subscribers. Coaxial cable runs from the optical fiber feeders to each customer or subscriber. The functionality of the HFC network 415 allows for efficient bidirectional data flow between the client-side set-top box 106 and a server-side application server 440 (also referred to as back end application server).

The CATV system 400 is in the form of a distributed client-server computing system for providing video and data flow across the HFC network 415 between server-side services providers (e.g., cable television/services providers) via a server-side head end 426 and a client-side customer via a client-side set-top box (STB) 106 functionally connected to a customer receiving device, such as the television set 104. As is understood by those skilled in the art, modern CATV systems 400 may provide a variety of services across the HFC network 415 including traditional digital and analog video programming, telephone services, high speed Internet access, video-on-demand, and information services.

On the client side of the CATV system 400, digital and analog video programming and digital and analog data are provided to the customer television set 104 via the set-top box (STB) 106. Interactive television services that allow a customer to input data to the CATV system 400 likewise are provided by the STB 106. As illustrated in FIG. 4, the STB 106 is a multipurpose computing device having a computer processor, memory, and an input/output mechanism. The input/output mechanism receives input from server-side processes via the HFC network 415 and from customers via input devices such as the remote control device 428, keyboard 430, or other computing device, such as a tablet/slate computer, smart phone, etc. The remote control device 428 and the keyboard 430 may communicate with the STB 106 via a suitable communication transport such as the infrared connection 432. The STB 106 also includes a video processor for processing and providing digital and analog video signaling to the television set 104 via a cable communication transport 434. A multi-channel tuner is provided for processing video and data to and from the STB 106 and the server-side head end system 426, described below.

The STB 106 also includes an operating system 422 for directing the functions of the STB 106 in conjunction with a variety of client applications 425. For example, if a client application 425 requires a news flash from a third-party news source to be displayed on the television 104, the operating system 422 may cause the graphics functionality and video processor of the STB 106, for example, to output the news flash to the television 104 at the direction of the client application 425 responsible for displaying news items. According to embodiments, the client applications 425 may include one or more applications suitable for coordinating third party content items to the television 104 and for locally storing third party content to a DVR storage capacity at the STB 106 in accordance with embodiments described above.

Because a variety of different operating systems 422 may be utilized by a variety of different brands and types of set-top boxes, a middleware layer 424 may be provided to allow a given software application to be executed by a variety of different operating systems. According to an embodiment, the middleware layer 424 may include a set of application programming interfaces (APIs) that are exposed to client applications 425 and operating systems 422 that allow the client applications to communicate with the operating systems through common data calls understood via the API set. As described below, a corresponding middleware layer is included on the server side of the CATV system 400 for facilitating communication between the server-side application server and the client-side STB 106. The middleware layer 442 of the server-side application server and the middleware layer 424 of the client-side STB 106 may format data passed between the client side and server side according to the Extensible Markup Language (XML).

According to one embodiment, the set-top box 106 passes digital and analog video and data signaling to the television 104 via a one-way communication transport 434. According to other embodiments, two-way communication transports may be utilized, for example, via high definition multimedia (HDMI) ports. The STB 106 may receive video and data from the server side of the CATV system 400 via the HFC network 415 through a video/data downlink and data via a data downlink. The STB 106 may transmit data from the client side of the CATV system 400 to the server side of the CATV system 400 via the HFC network 415 via one data uplink. The video/data downlink is an "in band" downlink that allows for digital and analog video and data signaling from the server side of the CATV system 400 through the HFC network 415 to the set-top box 106 for use by the STB 106 and for distribution to the television set 104. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 4, between the HFC network 415 and the set-top box 106 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 106 and the server-side application server 440 is typically passed through the "out of band" data links. Alternatively, an "in band" data carousel may be positioned in an "in band" channel into which a data feed may be processed from the server-side application server 440 through the HFC network 415 to the client-side STB 106. Operation of data transport between components of the CATV system 400, described with reference to FIG. 4, is well known to those skilled in the art.

Referring still to FIG. 4, the head end (also referred to as the back end) of the CATV system 400 is positioned on the server side of the CATV system and includes hardware and software systems responsible for originating and managing content for distributing through the HFC network 415 to client-side STBs 106 for presentation to customers via televisions 104. As described above, a number of services may be provided by the CATV system 400, including digital and analog video programming, interactive television services, telephone services, video-on-demand services, targeted advertising, and provision of information content.

The application server 440 is a general-purpose computing system operative to assemble and manage data sent to and received from the client-side set-top box 106 via the HFC network 415. As described above with reference to the set-top box 106, the application server 440 includes a middleware layer 442 for processing and preparing data from the head end of the CATV system 400 for receipt and use by the client-side set-top box 106. For example, the application server 440 via the middleware layer 442 may obtain data from third-party services 446 via the Internet 420 for transmitting to a customer through the HFC network 415 and the set-top box 106. For example, content metadata a third-party content provider service may be downloaded by the application server via the Internet 420. When the application server 440 receives the downloaded content metadata, the middleware layer 442 may be utilized to format the content metadata for receipt and use by the set-top box 106. Therefore, content metadata may be sent and categorized based on the availability to the customer's program guide data.

According to one embodiment, data obtained and managed by the middleware layer 442 of the application server 440 is formatted according to the Extensible Markup Language and is passed to the set-top box 106 through the HFC network 415 where the XML-formatted data may be utilized by a client application 425 in concert with the middleware layer 424, as described above. As should be appreciated by those skilled in the art, a variety of third-party services data, including news data, weather data, sports data and other information content may be obtained by the application server 440 via distributed computing environments such as the Internet 420 for provision to customers via the HFC network 415 and the set-top box 106.

According to embodiments, the application server 440 obtains customer support services data, including billing data, information on customer work order status, answers to frequently asked questions, services provider contact information, and the like from data services 460 for provision to the customer via an interactive television session. As illustrated in FIG. 4, the services provider data services 460 include a number of services operated by the services provider of the CATV system 400 which may include data on a given customer.

A billing system 462 may include information such as a customer's name, street address, business identification number, Social Security number, credit history, and information regarding services and products subscribed to by the customer. According to embodiments, the billing system 462 may also include billing data for services and products subscribed to by the customer for bill processing, billing presentment and payment receipt.

A customer information database 468 may include general information about customers such as place of employment, business address, business telephone number, and demographic information such as age, gender, educational level, and the like. The customer information database 468 may also include information on pending work orders for services or products ordered by the customer. The customer information database 468 may also include general customer information such as answers to frequently asked customer questions and contact information for various service provider offices/departments. According to an embodiment, the customer information database 468 may also include profile information for customers/subscribers that include permissions and authentication information associated with or required for accessing and recording third party content as set out above. As should be understood, this information may be stored in a variety of disparate databases operated by the cable services provider.

Referring still to FIG. 4, web services system 450 is illustrated between the application server 440 and the data services 460. According to embodiments, web services system 450 serves as a collection point for data requested from each of the disparate data services systems comprising the data services 460. According to embodiments, when the application server 440 requires customer services data from one or more of the data services 460, the application server 440 passes a data query to the web services system 450. The web services system formulates a data query to each of the available data services systems for obtaining any required data for a requesting customer as identified by a set-top box identification associated with the customer. The web services system 450 serves as an abstraction layer between the various data services systems and the application server 440. That is, the application server 440 is not required to communicate with the disparate data services systems, nor is the application server 440 required to understand the data structures or data types utilized by the disparate data services systems. The web services system 450 is operative to communicate with each of the disparate data services systems for obtaining necessary customer data. The customer data obtained by the web services system is assembled and is returned to the application server 440 for ultimate processing via the middleware layer 442, as described above.

An authentication system 466 may include information such as secure user names, subscriber profiles, subscriber IDs, and passwords utilized by customers for access to network services. As should be understood by those skilled in the art, the disparate systems 462, 464, 466, 468 may be integrated or provided in any combination of separate systems, wherein FIG. 4 shows only one example.

Although described herein in combination with various computing devices, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIG. 1-4. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method for automatically populating a programming guide mosaic screen with content relevant to a user, the method comprising:
   providing television services via a service provider over a content delivery network to users via one or more receiver devices;
   collecting video content viewing activity of a user;
   collecting user preference data;
   using the collected video content viewing activity of the user and the collected user preference data for determining video content items to recommend to the user and providing a programming guide by displaying a mosaic of the recommended video content items available for selection by the user;
   in response to each occurrence of receiving an indication of a selection to display the programming guide on a receiver device while the user is watching content from the receiver device:
      querying the service provider for recommended video content items;
      repopulating the mosaic such that the mosaic is updated to include one or more of the recommended video content items based on the collected video content viewing activity of the user and the collected user preference data; and
      displaying in the repopulated mosaic a plurality of tiles associated with the one or more recommended video content items along with currently watched content in the repopulated mosaic.

2. The method of claim 1, wherein collecting video content viewing activity of the user comprises collecting one or more of:
   a genre associated with a viewed video content item;
   data associated with a day of the week the user viewed a video content item; or
   data associated with a time of day the user viewed a video content item.

3. The method of claim 2, wherein determining one or more video content items to recommend to the user comprises identifying one or more video content items similarly matching a genre associated with content typically viewed by the user and that is available for viewing at a time similar to the time of day the user typically views the content.

4. The method of claim 1, wherein collecting user preference data comprises collecting one or more of:
   favorite channel selections made by the user;
   video content purchases made by the user;
   feedback provided by the user;
   video content restriction data;
   keyword search data for content; or
   parental control data.

5. The method of claim 1, further comprising:
   collecting video content viewing activity of other users;
   collecting feedback provided by other users; and
   using the collected video content viewing activity of the other users and the collected feedback provided by other users in conjunction with the collected video content viewing activity of the user and the collected user preference data for determining one or more video content items to recommend to the user.

6. The method of claim 1, wherein determining one or more video content items to recommend to the user comprises determining one or more video content items available on one or more channels selected by the user as a favorite channel.

7. The method of claim 1, further comprising automatically populating the programming guide with one or more of:
   video content items with metadata that is similarly matched with video content typically viewed by the user;
   video content items airing on the user's selected favorite channels;
   video content items matching a keyword used by the user to search for video content;
   video content items highly rated by the user;
   video content items highly rated by other users;
   video content items airing at a time the user typically watches similarly matched video content; or
   video content that is not restricted for the user.

8. The method of claim 7, further comprising:
   collecting additional video content viewing activity of the user or user preference data;
   using the additional collected video content viewing activity of the user and the additional collected user preference data for determining one or more video content items to recommend to the user;
   retrieving the one or more video content items to recommend to the user for display in the programming guide mosaic screen; and
   dynamically updating the programming guide with the one or more retrieved video content items.

9. A system for automatically populating a programming guide mosaic screen with content relevant to a user, the system comprising:
   a memory storage; and
   one or more processors coupled to the memory storage, wherein the one or more processors are operable to:
      collect video content viewing activity of a user;
      collect user preference data;
      use the collected video content viewing activity of the user and the collected user preference data for determining one or more video content items to recommend to the user and provide a programming guide by displaying a mosaic of the recommended video content items available for selection by the user;
      in response to each occurrence of receiving an indication of a selection to display the programming guide on a receiver device while the user is watching content from the receiver device:
         query a service provider for recommended video content items;
         repopulate the mosaic such that the mosaic is updated to include one or more of the recommended video content items based on the collected video content viewing activity of the user and the collected user preference data; and
         display in the repopulated mosaic a plurality of tiles associated with the one or more recommended video content items along with currently watched content in the repopulated mosaic.

10. The system of claim 9, wherein in collecting video content viewing activity of the user, the one or more processors are operable to collect one or more of:
   a genre associated with a viewed video content item;
   data associated with a day of the week the user viewed a video content item; or
   data associated with a time of day the user viewed a video content item.

11. The system of claim 10, wherein in determining one or more video content items to recommend to the user, the one or more processors are operable to identify one or more video content items similarly matching a genre associated with content typically viewed by the user and that is available for viewing at a time similar to the time of day the user typically views the content.

12. The system of claim 9, wherein in collecting user preference data, the one or more processors are operable to collect one or more of:
   favorite channel selections made by the user;
   video content purchases made by the user;
   feedback provided by the user;
   video content restriction data;
   keyword search data for content; or
   parental control data.

13. The system of claim 9, wherein the one or more processors are further operable to:
   collect video content viewing activity of other users;
   collect feedback provided by other users; and
   use the collected video content viewing activity of the other users and the collected feedback provided by other users in conjunction with the collected video content viewing activity of the user and the collected user preference data for determining one or more video content items to recommend to the user.

14. The system of claim 9, wherein in determining one or more video content items to recommend to the user, the one or more processors are operable to determine one or more video content items available on one or more channels selected by the user as a favorite channel.

15. The system of claim 9, wherein the one or more processors are further operable to automatically populate the programming guide with one or more of:
   video content items with metadata that is similarly matched with video content typically viewed by the user;
   video content items airing on the user's selected favorite channels;
   video content items matching a keyword used by the user to search for video content;
   video content items highly rated by the user;
   video content items highly rated by other users;
   video content items airing at a time the user typically watches similarly matched video content; or
   video content that is not restricted for the user.

16. The system of claim 15, wherein the one or more processors are further operable to:
   collect additional video content viewing activity of the user or user preference data;
   use the additional collected video content viewing activity of the user and the additional collected user preference data for determining one or more video content items to recommend to the user;
   retrieve the one or more video content items to recommend to the user for display in the programming guide mosaic screen; and
   dynamically update the programming guide with the one or more retrieved video content items.

17. A method for populating a programming guide mosaic screen with content relevant to a user, comprising:
   providing television services via a service provider over a content delivery network to users via one or more receiver devices;
   using collected video content viewing activity of the user and collected user preference data for determining video content items to recommend to the user and providing a programming guide by displaying a mosaic of the recommended video content items available for selection by the user;
   in response to each occurrence of receiving an indication of a selection to display the programming guide on a receiver device while the user is watching content from the receiver device;
      querying the service provider for recommended video content items;
      repopulating the mosaic such that the mosaic is updated to include one or more of the recommended video content items based on the collected video content viewing activity of the user and the collected user preference data; and
      displaying in the repopulated mosaic a plurality of tiles associated with the recommended video content items along with currently watched content in the repopulated mosaic.

18. The method of claim 17, wherein the collected video content viewing activity of the user comprises data associated with one or more of:
   a genre associated with a viewed video content item;
   a day of the week the user viewed a video content item; or
   a time of day the user viewed a video content item.

19. The method of claim 17, wherein the collected user preference data comprises one or more of:
   favorite channel selections made by the user;
   video content purchases made by the user;
   feedback provided by the user;
   video content restriction data;
   keyword search data for content; or
   parental control data.

20. The method of claim 17, further comprising automatically populating the programming guide with one or more of:
   video content items with metadata that is similarly matched with video content typically viewed by the user;
   video content items airing on the user's selected favorite channels;
   video content items matching a keyword used by the user to search for video content;
   video content items highly rated by the user;
   video content items highly rated by other users;
   video content items airing at a time the user typically watches similarly matched video content; or
   video content that is not restricted for the user.

* * * * *